United States Patent [19]  
Martel et al.

[11] 3,900,468  
[45] Aug. 19, 1975

[54] CEPHALOSPORAN DERIVATIVES AND THEIR PREPARATION
[75] Inventors: Jacques Martel, Bondy; René Heymes, Romainville, both of France
[73] Assignee: Roussel UCLAF, Paris, France
[22] Filed: Feb. 15, 1972
[21] Appl. No.: 226,526

[30] Foreign Application Priority Data
Feb. 18, 1971 France ............................ 71.05555
Feb. 18, 1971 France ............................ 71.05556

[52] U.S. Cl. ............................ 260/243 C; 424/246
[51] Int. Cl. ............................ C07d 99/24
[58] Field of Search ................................ 260/243 C

[56] References Cited
UNITED STATES PATENTS
3,487,070  12/1969  Sheehan ............................ 260/239
3,546,211  12/1970  Bose ................................. 260/239
3,708,477  1/1973   Martel ............................. 260/243 C OTHER PUBLICATIONS
Blatt, ed., "Organic Syntheses," Vol. 2, Wiley and Sons, New York, (1943), p. 15.

*Primary Examiner*—Nicholas S. Rizzo
*Attorney, Agent, or Firm*—Hammond & Littell

[57] ABSTRACT
Cis, trans and cis-trans mixtures of DL 7-R-amino-desacetoxy-cephalosporan compounds of the formula

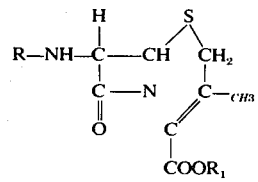

wherein R is selected from the group consisting of hydrogen and trityl and $R_1$ is selected from the group consisting of lower alkyl of 1 to 6 carbon atoms optionally substituted with at least one chlorine and aralkyl of 7 to 15 carbon atoms with the proviso when R is hydrogen, $R_1$ is selected from the group consisting of tert.-butyl, benzyl and ethyl, processes for their preparation and novel intermediates produced therein.

4 Claims, No Drawings

CEPHALOSPORAN DERIVATIVES AND THEIR PREPARATION

OBJECTS OF THE INVENTION

It is an object of the invention to provide the novel DL 7-R amino-desacetoxy-cephalosporanic acid compounds of formula I.

It is a further object of the invention to provide novel processes for producing the compounds of formula I.

It is another object of the invention to provide novel intermediates for the preparation of compounds of formula I.

These and other objects and advantages will become obvious from the following detailed description.

THE INVENTION

The novel products of the invention are selected from the group consisting of cis, trans and cis-trans mixtures of DL 7-R-amino-desacetoxy-cephalosporanic compounds of the formula

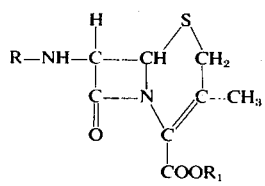
　I wherein R is selected from the group consisting of hydrogen and trityl and $R_1$ is selected from the group consisting of lower alkyl of 1 to 6 carbon atoms optionally substituted with at least one chlorine and aralkyl of 7 to 15 carbon atoms with the proviso that when R is hydrogen, $R_1$ is selected from the group consisting of tert.-butyl, benzyl and ethyl.

Examples of specific compounds of formula I are the tert.-butyl ester of DL 7-amino-desacetoxy-cephalosporanic acid and its 7-tritylamino derivative, the benzyl ester of DL 7-amino-desacetoxy-cephalosporanic acid and its 7-tritylamino derivative and the ethyl ester of DL 7-amino-desacetoxy-cephalosporanic acid and its 7-tritylamino derivative.

The novel total synthesis process of the invention is directed to compounds of the formula

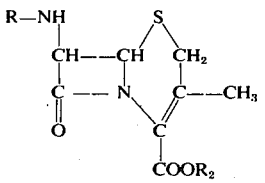
　II in the form of cis, trans or cis-trans mixtures wherein R is selected from the group consisting of hydrogen and trityl and $R_2$ is lower alkyl of 1 to 6 carbon atoms optionally substituted with at least one chlorine and aralkyl of 7 to 15 carbon atoms comprises reacting an enamine of the formula

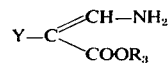
　III wherein $R_3$ is selected from the group consisting of alkyl of 1 to 10 carbon atoms and aralkyl of 7 to 15 carbon atoms and Y is selected from the group consisting of cyclic imido, benzoylamino and thiobenzoylamino with hydrogen sulfide in the presence of an acid of the formula HX wherein X is selected from the group consisting of halogen, $—SO_4H$ and $—SO_3H$ to form a thioaminal of the formula

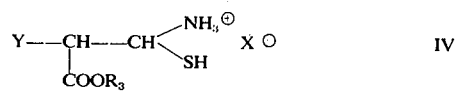
　IV which occurs in erythro and/or threo isomeric form, reacting the latter in the presence of a tertiary amine with an ester of α-keto-β-methylene-butyric acid of the formula

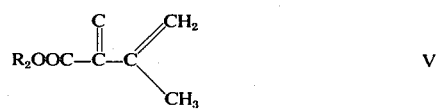
　V wherein $R_2$ has the above definition to form a 1,3-thiazane of the formula

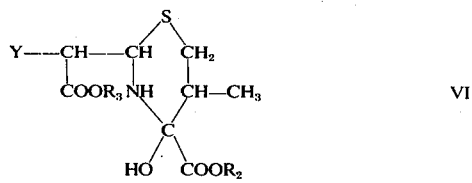
　VI in the form of its erythro and/or threo form independent of the configuration of 3-and 4-carbon atoms, reacting the latter with a dehydrating agent to form a 1,3-thiazine of the formula

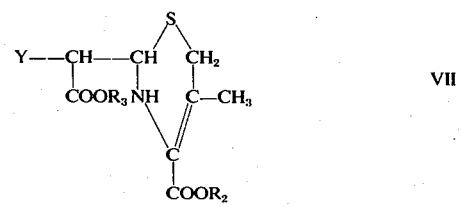
　VII occuring in the form of its erythro and/or threo isomers, subjecting the latter to acid hydrolysis or reaction with hydrazine for a functional exchange to form a compound of the formula

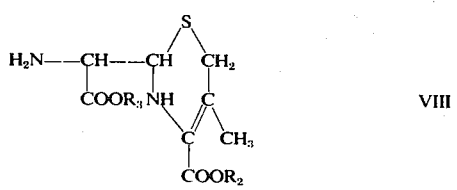
　VIII occurring in the form its erythro and/or threo isomers, selectively saponifying the latter with a basic agent to form a compound of the formula

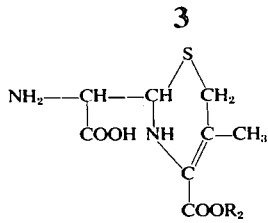

occurring in the form of its erythro and/or threo isomers, reacting the latter with a tritylation agent to form a compound of the formula

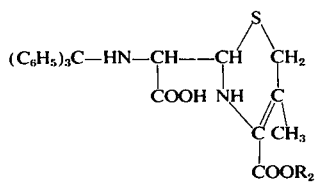

occurring in the form of its erythro and/or threo isomers and cyclizing the latter with a lactamization agent to form a compound of formula II wherein R is trityl and optionally reacting the latter with an acidic agent to form the compound of formula II wherein R is hydrogen.

As a modification of the process, certain intermediates may be purified by salification with an acid or base. For example, a compound of formula IX in the form of its erythro and/or threo isomers may be prepared by reacting a compound of formula VII with hydrazine for a functional exchange or under acidic hydrolysis conditions to form a compound of formula VIII in the form of its erythro and/or threo isomers and then reacting the latter with an organic acid such as oxalic or hydrogen halide to form the acid addition salt of the formula

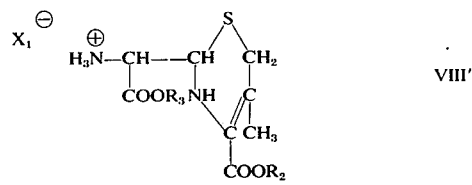

wherein $X_1$ is the acid residue in the form of its erythro and/or threo isomers which is then treated with a base to obtain the compound of formula IX.

Also, an ester of DL 7-tritylamino-desacetoxy-cephalosporanic acid of formula II in the form of its erythro and/or threo isomers may be prepared by reacting a 1,3-thiazine of formula IX in its erythro and/or threo form with a tritylation derivative to form a raw compound of formula X in the form of its erythro and/or threo isomers, reacting the latter with a secondary amine to form the corresponding amine salt of the formula

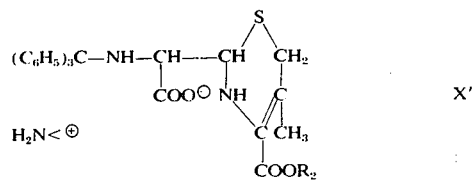

in the form of its erythro and/or threo isomers wherein $H_2N^+$ is a cation derived from a secondary amine and subjecting the latter to acid hydrolysis followed by cyclization with a lactamization agent to obtain the desired compound. The compounds IV, VI, VII, VIII, IX and X possess two asymetric carton atoms and thus can exist in the form of their threoisomer and erythro isomer. The threo/erythro ratio may vary as a function of the working conditions. The alkaline treatment of the α-carbalkoxy-aminomethyl-1,3-thiazine of the formula VIII existing in the form of a mixture of threo-and erythro isomers can lead in certain instances to α-carboxy-aminomethyl-1,3-thiazine of formula IX existing almost exclusively in the form of its threo-isomer. It should be noted that only the threo isomer of the α-carboxy tritylamino methyl 1,3-thiazine of formula X leads through cyclization to the ester of the DL 7-tritylamino-desacetoxy-cephalosporanic acid of formula II with the 6H, 7H-cis configuration peculiar to the derivatives of the cephalosporin of natural origin. It is most desirable to obtain the maximum of the threo isomer compound of formula X which can be transformed with very good yields into the cis-isomer of the compound of formula II.

In a preferred embodiment of the process of the invention, the acid HX in whose presence the enamine of formula III is reacted with hydrogen sulfide is anhydrous hydrochloric acid. It is also possible to use other mineral acids such as sulfuric acid or a sulfonic acid such as toluene sulfonic acid or methanesulfonic acid. The tertiary amine in whose presence is effected the condensation of the thioaminal of formula IV with the ester of α-keto-β-methylene-butyric acid of formula V is preferably triethylamine. This condensation can also be performed in the presence of other tertiary amines and particularly in the presence of N-methylpiperidine, pyridine, trimethylamine, N-methylpyrrolidine or quinoline.

The dehydration agent, which is reacted with the 1,3-thiazane of formula VI to obtain the 1,3-thiazine of formula VII is an aqueous solution of hydrochloric acid or oxalic acids. When Y in the 1,3-thiazine of the general formula VII is a cyclic imido group, the Y group is preferably split off by an exchange of functions with the aid of hydrazine and when Y is a benzolyamino or a thiobenzoylamino group, a hydrogenolysis is preferably carried out. In the latter case, it is also possible to first effect an alkylation of the ketone or thioketone function with an alkyl sulfate or with Meerwein reagent to obtain the corresponding imino ether or the thioimino ether and then in a second step, hydrolyze the said compound with a mineral or organic acid such as acetic acid or dilute hydrochloride acid.

The basic agent used to perform the selective saponification of the group $COOR_3$ of the 1,3-thiazine of formula VIII is preferably lithium hydroxide but potassium hydroxide, sodium hydroxide or an alkali metal carbonate, such as sodium- or potassium carbonate may be used. The tritylation agent with which the 1,3-thiazine of formula IX is treated to obtain the 1,3-thiazine of formula X is preferably trityl chloride and this reaction is carried out in the presence of an alkaline agent and more particularly in the presence of a tertiary amine such as triethylamine, trimethylamine, N-methylpiperidine, pyridine, N-methylpyrrolidine or quinoline.

As lactamization agent for the cyclization of the 1,3-thiazine of formula X, a dialkyl or dicycloalkyl-carbodiimide such as dicyclohexyl-carbodiimide or diisopropyl-carbodiimide is used, and the reaction is carried out in a polar solvent such as nitromethane, a disubstituted amide, a sulfoxide, acetone or acetonitrile and in presence of a tertiary amine such as pyridine, a collidine or a dialkylaniline, and this medium could admit an additional solvent such as methylene chloride or the chloroform.

The alkaline agent used to convert the erythro isomer of 1,3-thiazine of formula X to the threo isomer is an alkali metal hydroxide such as sodium hydroxide, or lithium hydroxide and the reaction is performed in an alkanol such as methanol or ethanol. The acidic agent, used to obtain a compound of formula II wherein R is H, starting from a compound of formula II wherein R is trityl is advantageously a mineral or organic acid, such as hydrochloric acid or acetic acid, and the reaction is in an organic solvent such as nitromethane, chloroform, methylene chloride or methanol.

The compounds of formula II are particularly interesting intermediates for the synthesis of compounds of the family of cephalosporins with antibiotic activity. The compounds of formula II wherein R is trityl can be detritylated with an acidic agent to obtain the corresponding 7-amino compounds of formula II wherein R is H, which are useful intermediates by reacting with functional derivatives of a carboxylic acid, which may react with amines, and then by acid hydrolysis to obtain compounds possessing an activity analogous to that of cephalexine such as described in U.S. Pat. No. 3,124,576. Besides, the compounds of formula II wherein R is H can after reaction with phenoxyacetic acid chloride be transformed into cephalosporin V by the method described by WABBER et al [J.A.C.S., Vol. 91, (1969) 5 674].

The process of the invention thus permits total synthesis of compounds of the type of 7-amino-desacetoxy-cephalosporanic acid which has not been possible without beginning with a compound having the basic nucleus.

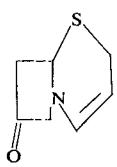

Another feature of the invention are the novel intermediates, thioaminals of the formula

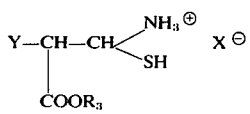  IV occurring in the form of threo and/or erythro isomers wherein $X^-$ is halogen or sulfuric-or sulfonic anion, $R_3$ and Y are defined as above and particularly the hydrochloride of thioaminal of methyl phthalimido-malonaldehydate.

Also novel are derivatives of 1,3-thiazane of the formula

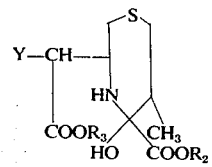  VI occurring in the form of threo and/or erythro isomers, independent of the configuration of the 3 and 4 carbons wherein $R_2$, $R_3$ and Y are defined as above and particularly α-methoxycarbonyl-2-phalimidomethyl-4-ethoxycarbonyl-4-hydroxy-5-methyl-1,3-thiazane, α-methoxycarbonyl-2-phthalimidomethyl-4-terbutoxycarbonyl-4-hydroxy-5-methyl-1,3-thiazane and α-methoxycarbonyl-2-phthalimidomethyl-4-benzyloxycarbonyl-4-hydroxy-5-methyl-1,3-thiazane.

Also novel are the derivatives of 1,3-thiazines of the formula

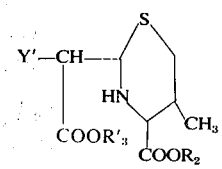  XI and their mineral or organic acid salts occurring in the form of threo and/or erythro isomers in which Y' is amino, a cyclic imido, a benzoylamino or a thiobenzoylamino and $R_2$ is defined as above, $R'_3$ is a linear or branched alkyl radical with 1 to 10 carbon atoms or an aralkyl radical with 7 to 15 carbon atoms, or if Y' represents an amino group $R'_3$ is hydrogen, and particularly α-methoxycarbonyl-2-phthalimidomethyl-4-ethoxycarbonyl-5-methyl-2,3-dihydro-6H-1,3-thiazine; α-methoxycarbonyl-2-phthalimidomethyl-4-terbutoxycarbonyl-5-methyl-2,3-dihydro-6H-1,3-thiazine; α-methoxycarbonyl-2-phthalimidomethyl-4-benzoyloxycarbonyl-5-methyl-2,3-dihydro-6H-1,3-thiazine; α-methoxycarbonyl-2-aminomethyl-4-ethoxycarbonyl-5-methyl-2,3-dihydroxy-6H-1,3-thiazine, its oxalate and its hydrochloride; α-methoxycarbonyl-2-aminomethyl-4-terbutoxycarbonyl-5-methyl-2,3-dihydro-6H-1,3-thiazine, its oxalate and its hydrochloride; α-methoxycarbonyl-2-aminomethyl-4-benzyloxycarbonyl-5-methyl-2,3-dihydro-6H-1,3-thiazine, its oxalate and its hydrochloride; α-carboxy-2-aminomethyl-4-ethoxycarbonyl-5-methyl-2,3-dihydro-6H-1,3-thiazine; α-carboxy-2-aminomethyl-4-terbutoxycarbonyl-5-methyl-2,3-dihydro-6H-1,3-thiazine and α-carboxy-2-aminomethyl-4-benzyloxycarbonyl-5-methyl-2,3-dihydro-6H-1,3-thiazine.

Also novel are the derivatives of α-carboxy-tritylaminomethyl-1,3-thiazine of the formula

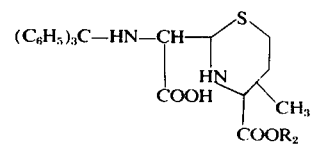  X and their secondary amine salts occuring in the form of threo and/or erythro isomers wherein $R_2$ is defined as above and particularly α-carboxy-2-tritylaminomethyl-4-ethoxycarbonyl-5-methyl-2,3-dihydro-6H-1,3-thiazine and its diethylamine salts, α-carboxy-2-tritylaminomethyl-4-terbutoxycarbonyl-5-methyl-2,3-dihydro-6H-1,3-thiazine and its diethylamine salt and α-carboxy-2-tritylaminomethyl-4-benzyloxycarbonyl-5-methyl-2,3-dihydro-6H-1,3-thiazine and its diethylamine salt.

It is an other object of the invention to provide a process of resolving esters of DL-7-amino-desacetoxy-cephalosporanic acid of general formula

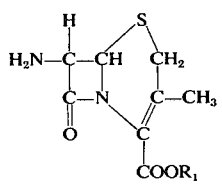

in the form of cis, trans or cis-trans mixtures, wherein $R_1$ is selected from the group consisting of lower alkyl of 1 to 6 carbon atoms optionally substituted with at least one chlorine and aralkyl of 7 to 15 carbon atoms, comprising reacting the DL-compound of the above formula with an optically active organic acid.

In the following examples there are described several preferred embodiments to illustrate the invention. However, it should be understood that the invention is not intended to be limited to the specific embodiments.

EXAMPLE I

TERT-BUTYL CIS DL 7-TRITYLAMINO-DESACETOXY-CEPHALOSPORANATE

STEP A: SODIUM α-KETO-β-METHYLENE-BUTYRATE 65 ml of N sodium hydroxide were added with stirring and cooling to a solution of 11.5 g of ethyl α-keto-β-methylene-butyrate (made by process described in J. Am. Chem. Soc., 1964, p. 766) in 77 ml of dioxane and the mixture was allowed to stand for 5 minutes. The mixture was evaporated to dryness under reduced pressure and the residue triturated in 50 ml of ethanol. The mixture was evaporated to dryness and the residue was triturated in ether, vacuum filtered and washed with ether. The product was dried under vacuum to obtain 8.72 g of sodium α-keto-β-methylene-butyrate which was used as is for the next step.

Analysis: $C_5H_5O_3Na \cdot 0.25 H_2O$; molecular weight = 140.08 Calculated: %C 42.89; %H 3.95; Found: C 42.7; H 3.9

U.V. Spectrum (ethanol):
Max. at 215 nm: $E_{1cm}^{1\%} = 542$
Max. at 352 nm: $E_{1cm}^{1\%} = 3$

STEP B: TERT.-BUTYL α-KETO-β-METHYLENE-BUTYRATE 13.6 g of sodium α-keto-β-methylene-butyrate were cooled for 10 minutes at −40°C and then 200 ml of liquid isobutylene and 5 ml of concentrated sulfuric acid were added at the low temperature. The reaction mixture was allowed to return to room temperature and was then stirred for 21 hours. After cooling to −40°C, excess isobutylene was removed by heating at 30°C and the mixture was evaporated to dryness. The residue was added to 100 ml of methylene chloride and 60 ml of 2N sodium hydroxide to obtain a pH of 8. The mixture was stirred and the organic phase was decanted and washed with water. The aqueous phase was reextracted with methylene chloride and the organic phases were combined and dried over magnesium sulfate. The mixture was vacuum filtered and the filter was washed with methylene chloride. The filtrate was evaporated to dryness under reduced pressure to obtain 13.7 g of tert-butyl α-keto-β-methylene-butyrate which was used as is for Step D. The product occurred in the form of an oily liquid soluble in alcohols, ether and chorinated solvents and insoluble in water.

IR Spectrum (chloroform):
Presence of CO at 1730 and $1683^{cm-1}$ and of C═C at $1650^{cm-1}$ U.V. Spectrum (ethanol)
Max. at 225 nm: $E_{1cm}^{1\%} = 231$ STEP C: THIOAMINAL OF METHYL PHTHALIMI-DO-MALONALDEHYDRATE.HCl 12 g of hydrogen sulfide, 8 g of gaseous hydrochloric acid and 50 g of methyl 2-phthalimido-3-amino-acrylate (obtained by process of French Patent No. 1,469,529) were dissolved in 400 ml of nitromethane cooled to −10°C and the mixture was then allowed to stand for 2 hours at room temperature. After cooling, the mixture was vacuum filtered and the solid recovered was washed with a 50-50 nitromethane-ether mixture and then with ether and dried to obtain a first crop of 17.1 g of the hydrochloride of thioaminal of the threo isomer of methyl phthalimido-malonaldehydate. The solution was allowed to stand for another 3 hours to obtain a second crop of 3.6 g of the said product. The mother liquor was cooled to −10°C and 4 g of gaseous hydrochloric acid and 6 g of hydrogen sulfide were added thereto. The mixture was allowed to stand overnight at room temperature to furnish a third crop of 18.6 g of product. Finally, the solution was allowed to stand for 3 days to obtain a fourth crop of 3.2 g of the erythro isomer for a total yield of 42.5 g. The product occurred in the form of colorless crystals melting at about 180°C with decomposition and soluble in water, slightly soluble in ethanol and methanol and insoluble in ether and chloroform.

Analysis: $C_{12}H_{13}O_4N_2SCl$; molecular weight = 316.77: Calculated: %C 45.49; %H 4.13; %N 8.85; %S 10.13; %Cl 11.20; Found: C 45.2; H 4.1; N 8.7; S 10.2; Cl 11.3

IR Spectrum (Nujol):
Presence of carbonyls at 1782 and $1718^{cm-1}$, of

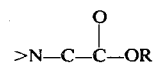

at $1748^{cm-1}$ and aromatic.

STEP D: THREO ISOMER OF α-METHOXYCARBO-NYL-2-PHTHALIMIDOMETHYL-4-TERT.-BUTOXYCARBONYL-5-METHYL-2,3-DIHYDRO-6H-1,3-THIAZINE

A mixture of 32.8 g of tert-butyl α-keto-β-methylenebutyrate, 100 ml of dioxane and 43 g of the hydrochloride of the thioaminal of methyl phthalimido-malonaldehydate (first crop of Step C) was cooled to 10°C and then a solution of 18.9 ml of triethyamine in 100 ml of dioxane was added thereto with stirring under a nitrogen atmosphere while maintaining an interior temperature of 13°C. The interior temperature was then raised to 23°C and after the addition of 100 ml of ether, the mixture was vacuum filtered. The filter was washed with ether and the combined filtrates were evaporated to dryness. The residue was dissolved in 135 ml of ethanol and 13 ml of water and then 12 cc of N hydrochloric acid were added to the solution. Crystallization began and the mixture was stirred for one hour under a nitrogen atmosphere and then vacuum filtered. The recovered precipitate was washed with ethanol cooled to −40°C and then with petroleum ether and dried to obtain 27.4 g of the threo isomer of α-methoxycarbonyl-2-phthalimidomethyl-4-tert-butoxycarbonyl-5-methyl-2,3-dihydro-6H-1,3-thiazine. By concentration of the mother liquors, a second crop of 2.5 g of the product were obtained for a total yield of 29.9 g of the threo isomer. The product occurred in the form of yellow crystals melting at 138°C and soluble in chloroform, slightly soluble in ethanol and ether and insoluble in water.

Analysis: $C_{21}H_{24}O_6N_2S$; molecular weight = 432.5: Calculated: %C 58.33; %H 5.59; %N 6.48; %S 7.40; Found: C 58.5; H 5.4; N 6.4; 7.6
U.V. Spectrum (ethanol):
 Max. at 219 nm: $E_{1cm}^{1\%} = 964$; $\epsilon = 41,500$ Inflex. towards 231 nm: $E_{1cm}^{1\%} = 459$ Inflex. towards 239 nm: $E_{1cm}^{1\%} = 274$
 Max. at 290 290 $E_{1cm}^{1\%} = 117$; $\epsilon = 5,050$ STEP E: ERYTHRO ISOMER OF α-METHOXYCARBONYL-2-PHTHALIMIDOMETHYL-4-TERT-BUTOXYCARBONYL-5-METHYL-2,3-DIHYDRO-6H-1,3-THIAZINE 1.75 ml of triethylamine were added to a suspension of 2.55 g of tert.-butyl α-keto-β-methylene-butyrate and 3.96 g of the hydrochloride of the thioaminal of methyl phthalimidomalonaldehydate (fourth crop of stage C) in 12 ml of ethanol cooled to between 0° and −10°C and the mixture was allowed to stand at room temperature for 90 minutes. Crystallization was started and allowed to continue for 30 minutes. The mixture was vacuum filtered and the recovered precipitate was washed with ethanol and then with petroleum ether and dried under reduced pressure. The reisdue was passed over silica to obtain 1.9 g of the erythro isomer of α-methoxycarbonyl-2-phthalimidomethyl-4-tert-butoxycarbonyl-5-methyl-2,3-dihydro-6H-1,3-thiazine melting at 138°C. The product occurred in the form of pale yellow crystals soluble in chloroform, slightly soluble in ethanol and ether and insoluble in water.

Analysis: $C_{21}H_{24}O_6N_2S$; molecular weight = 432.5: Calculated: %C 58.33; %H 5.59; %N 6.48; %S 7.40; Found: C58.2; H 5.5; N 6.5; S 7.4
U.V. Spectrum (ethanol):
 Max. at 219 nm: $E_{1cm}^{1\%} = 1042$
 Inflex towards 231–32 nm: $E_{1cm}^{1\%} = 392$
 Max. at 239 nm: $E_{1cm}^{1\%} = 270$
 Max. at 291 nm: $E_{1cm}^{1\%} = 120$; $\epsilon = 5,200$
 Inflex. towards 301 nm: $E_{1cm}^{1\%} = 100$ STEP F: THREO AND ERYTHRO ISOMERS OF α-CARBOXY-2-AMINOMETHYL-4-TERT-BUTOXYCARBONYL-5-METHYL-2,3-DIHYDRO-6H-1,3-THIAZINE A mixture of 28 g of the threo isomer of α-methoxycarbony-2-phthalimidomethyl-4-tert-butoxycarbonyl-5-methyl-2,3-dihydro-6H-1,3-thiazine, 340 ml of chloroform, 65 ml of methanol and 39 ml of a solution of 5 g of hydrazine hydrate in 50 ml of methanol was refluxed overnight under a nitrogen atmosphere with agitation and was then cooled and filtered. The filter was rinsed with methylene chloride and the combined filtrates were evaporated to dryness. The residue was taken up in 130 ml of ether and the mixture was stirred for 10 minutes under a nitrogen atmosphere and was then filtered. The filter was rinsed with ether and the filtrate was treated with carbon black, stirred for 5 minutes under a nitrogen atmosphere and was vacuum filtered. The filter was rinsed again with ether and the filtrates were concentrated to dryness.

The residue was dissolved in 33 ml of dioxane and 16 ml of water were added thereto. After cooling the mixture to 0°C, 62.5 ml of N lithium hydroxide were added while keeping the temperature between 0° and 2°C. The mixture was stirred for 5 minutes under a nitrogen atmosphere and the pH was then adjusted to 6 by addition of acetic acid. The mixture was reduced to a small volume under reduced pressure and after the addition of 65 ml of acetone, the mixture was stirred for 5 minutes and was then vacuum filtered. The precipitate was washed with acetone and then ether and dried to obtain 5.83 g of the threo isomer of α-carboxy-2-aminomethyl-4-tert-butoxy-carbonyl-5-methyl-2,3-dihydro-6H-1,3-thiazine melting towards 200°C with decomposition. The product occurred as colorless crystals soluble in acidic water, slightly soluble in ethanol and insoluble in ether.

To recover the erythro isomer, the mother liquors were concentrated without removing water and were then added to ether. The mixture was stirred for 1 hour at room temperature and was then vacuum filtered. The precipitate was washed with ether, empasted with ether and then with water and finally with ether. The product was dried at room temperature under reduced pressure to obtain 5.27 g of the erythro isomer in the form of yellow crystals melting towards 170°C with decomposition.

Analysis: $C_{12}H_{20}O_4N_2S \cdot \frac{1}{2} H_2O$; molecular weight = 297.36; Calculated: %C 48.46; %H 7.12; %N 9.42; %S 10.78; Found: C 48.4; H 6.9; N 9.4; S 10.4

A. THREO ISOMER
 IR Spectrum (Nujol); Presence of C = O ester at $1727^{cm-1}$
 U.V. Spectrum (ethanol): Max. at 280 nm: $E_{1cm}^{1\%} = 103$ B. ERYTHRO ISOMER
 IR Spectrum (Nujol): Presence of carbonyl at 1718 and $1689^{cm-1}$
 U.V. Spectrum (ethanol): Max. at 282 nm: $E_{1cm}^{1\%} = 99$ STEP G: THREO ISOMER OF α-CARBOXY-2-TRITYLAMINOMETHYL-4-TERT-BUTOXYCARBONYL-5-METHYL-2,3-DIHYDRO-6H-1,3-THIAZINE A mixture of 6.62 g of the threo isomer of α-carboxy-2-aminomethyl-4-tert-butoxycarbonyl-5-methyl-2,3-dihydro-6H-1,3-thiazine in 46 ml of chloroform was cooled to -4°C with agitation under a nitrogen atmosphere and a solution of 10.4 g of trityl chloride in 30 ml of chloroform and 30 ml of a 2 M triethylamine in chloroform solution were added thereto. The mixture was allowed to stand for 3 hours while cooling and the temperature of the reaction mixture was allowed to rise to 20°C with stirring. The mixture was then concentrated to dryness and the residue was taken up in 110 ml of ether and 45 ml of water. The mixture was stirred and decanted and the ether phase was washed with a mixture of 45 ml of water and 22 ml of N hydrochloric acid with agitation. After decanting, the aqueous phases were reextracted with ether and the combined ether phases were concentrated to dryness under reduced pressure. The residue was triturated with 23 ml of ether and 23 ml of methanol were added thereto. The mixture was stirred for 20 minutes and then was vacuum filtered. The precipitate was washed with a 1 : 1 ether-methanol mixture, then with ether and dried to obtain 7.38 g of the threo isomer of α-carboxy-2-tritylaminomethyl-4-tert-butoxycarbonyl-5-methyl-2,3-dihydro-6H-1,3-thiazine.

The mother liquors were concentrated to a small volume and 90 ml isopropyl ether and then 1.8 ml of 4N lithium hydroxide were added thereto. The mixture was stirred and after 9 ml of water were added thereto, stirred again. The mixture was decanted and the organic layer was acidified to a pH of 4 with acetic acid addition and then was extracted with a mixture of 18 ml of methanol and 9 ml of water and then with water. The aqueous methanol phase was acidified to pH 4 by acetic acid addition and the methanol was evaporated off. The mixture was vacuum filtered and the precipitate was washed with water and dried. The residue was empasted with 5 ml of methanol and was vacuum filtered. The residue was washed with methanol and then ether and dried to obtain a second crop of 860 mg of the said threo isomer making a total yield of 8.24 g melting of 210°–220°C with decomposition. The product occurred in the form of colorless crystals soluble in chloroform, insoluble in water and methanol and slightly soluble in ethanol and ether.

Analysis: $C_{31}H_{34}O_4N_2S$; molecular weight = 530.70: Calculated: %C 70.15; %H 6.45; %N 5.28; %S 6.05; Found: C 69.9; H 6.6; N 5.5; S 6.3

IR Spectrum (Nujol):
Presence of conjugated ester and acid at 1703 and $1691^{cm-1}$, of C = C at $1643^{cm-1}$ and of aromatic.

U.V. Spectrum (ethanol):
Inflex. towards 227 nm: $E_{1cm}^{1\%} = 274$
Inflex. towards 255 nm; $E_{1cm}^{1\%} = 53$
Max. at 263 nm: $E_{1cm}^{1\%} = 53$
Max. at 272 nm: $E_{1cm}^{1\%} = 54$
Max. at 285 nm: $E_{1cm}^{1\%} = 57$

STEP H: TRITYLATION OF ERYTHRO ISOMER AND CONVERSION TO THREO ISOMER

A solution of 8.1 g of trityl chloride in 24 ml of chloroform and then 23.4 ml of a chloroform solution of 2M triethylamine were added to a suspension of 5.22 g of the erythreo isomer obtained in a preceding step in 36 ml of chloroform cooled to −5°C and the mixture was allowed to stand for 3 hours with cooling and then at room temperature for 30 minutes. The mixture was concentrated to dryness under reduced pressure and the residue was taken up in 100 ml of ether and 20 ml of water. The aqueous phase was decanted and 10 ml of water and 20 ml of N hydrochloric acid were added to the organic phase which was stirred and again decanted. The aqueous phase was reextracted with ether and the combined ether phases were dried over sodium sulfate and were vacuum filtered. The filtrate was evaporated to dryness and the residue was dissolved in 100 ml of isopropyl ether and 20 ml of methanol. After the addition of 4.5 ml of 4N lithium hydroxide, the mixture was stirred and 20 ml of water added. The mixture was decanted and the aqueous methanolic phase was acidified by the addition of acetic acid. The ether phase was reextracted with methanol and water and the combined aqueous methanol phases were acidified after which the methanol was evaporated under reduced pressure. The aqueous phase was extracted with chloroform and the chloroform phase was dried over sodium sulfate and evaporated to dryness. The residue was taken up in 5 ml of ether and 2 ml of methanol and the mixture was vacuum filtered. The residue was washed with ether and dried to obtain 1.28 g of the threo isomer identical to the product of the preceding step.

I. TERT-BUTYL CIS DL 7-TRITYLAMINO-DESACETOXY-CEPHALOSPORANATE

A solution of 3.36 g of dicyclimide (dicyclohexylcarbodiimide) in 20 ml of chloroform was added under a nitrogen atmosphere to a cooled suspension of 7.44 g of the threo isomer of α-carboxy-2-tritylaminomethyl-4-tert-butoxycarbonyl-5-methyl-2,3-dihydro-6H,1,3-thiazine in 700 ml of nitromethane and the mixture was stirred for 15 minutes under the nitrogen atmosphere. 14 ml of pyridine were added to the mixture which was then stirred overnight under a nitrogen atmosphere and then for 1 hour at 25°C. The mixture was vacuum filtered and the filter was rinsed with ether after which the filtrate was evaporated to dryness under reduced pressure. The residue was taken up in 50 ml of a 1-1 ether-methylene chloride mixture which was vacuum filtered. The filtrate was evaporated to dryness and the residue was stirred with 23 ml of ether. 23 ml of isopropyl ether were added thereto and the mixture was iced and vacuum filtered. The precipitate was washed with isopropyl ether and dried to obtain 5.34 g of the tert-butyl ester of cis DL 7-tritylamino-desacetoxy-cephalosporanic acid melting at 204°C. The product occurred as colorless crystals soluble in chloroform, slightly soluble in ether and methanol and insoluble in water.

Analysis: $C_{31}H_{32}O_3N_2S$; molecular weight = 512.7: Calculated: %C 72.62; %H 6.29; %N 5.46; %S 6.25; Found: C 72.3; H 6.3; N 5.5; S 5.9

U.V. Spectrum (ethanol):
Inflex towards 225 nm: $E_{1cm}^{1\%} = 329$
Max. at 265 nm: $E_{1cm}^{1\%} = 117 = 6,000$

EXAMPLE II

ETHYL CIS AND TRANS DL 7-TRITYLAMINO-DESACETOXY-CEPHALOSPORANATE

STEP A: THREO ISOMER OF α-METHOXYCARBONYL-2-PHTHALIMIDOMETHYL-4-ETHOXYCARBONYL-4-HYDROXY-5-METHYL-1,3-THIAZANE 1.65 ml of ethyl α-keto-β-methylene-butyrate (obtained by process of J. Am. Chem. Soc., 1964, p. 766) and 3.16 g of the hydrochloride of the thioaminal of methyl phthalimido-malonaldehydate (first crop of Step C of Example I) followed by 1.3 ml of triethylamine were added to 10 ml of ethanol cooled to −15°C while maintaining the said temperature and the reaction mixture was allowed to return to room temperature where it was held for 30 minutes. Sufficient methylene chloride was added to effect total dissolution and the mixture was concentrated to dryness. The residue was dissolved in methylene chloride and the organic phase was washed with water. The aqueous phases were reextracted with methylene chloride and the combined organic phases were dried over magnesium sulfate and were vacuum filtered. The filter was washed with methylene chloride and the filtrate was evaporated to dryness. The residue was taken up in 15 ml of ethanol and crystallization was started. The mixture was then vacuum filtered and the precipitate was washed with ethanol and then ether and dried. 1.9 g of the residue were dissolved in 6 ml of methylene chloride and the solution was vacuum filtered. The filter was washed with methylene chloride and the filtrate was reduced to a small volume. After the addition of 5 ml of ethanol, crystallization was started and the mixture was vacuum filtered. The precipitate was washed with ethanol, then ether and dried to obtain 1.64 g of the threo isomer of α-methoxycarbonyl-2-phthalimidomethyl-4-ethoxycarbonyl-4-hydroxy-5-methyl-1,3-thiazane melting at 152°C. The product occurred in the form of colorless crystals soluble in chloroform and methylene chloride, slightly soluble in ethanol and insoluble in water and ether.

Analysis: $C_{19}H_{22}O_7N_2S$; molecular weight = 422.47:
Calculated: %C 54.02; %H 5.25; %N 6.63; %S 7.58;
Found: C 53.8; H 5.2; N 6.5; S 7.8
IR Spectrum (chloroform):
  Presence of NH at $3298^{cm-1}$, of OH at $3531^{cm-1}$, of C=O at 1742, 1725 and $1779^{cm-1}$ and of aromatic at $1615^{cm-1}$.

STEP B: THREO ISOMER OF α-METHOXYCARBONYL-2-PHTHALIMIDOMETHYL-4-ETHOXYCARBONYL-5-METHYL-2,3-DIHYDRO-6H-1,3-THIAZINE

A mixture of 422 mg of the threo isomer of α-methoxycarbonyl-2-phthalimidomethyl-4-ethoxycarbonyl-4-hydroxy-5-methyl-1,3-thiazane, 1.5 ml of 90% ethanol, 0.5 ml of methylene chloride and a drop of N hydrochloric acid stood for 1 hour at room temperature and after evaporation of the methylene chloride, the mixture was vacuum filtered. The precipitate was washed with 75% ethanol and dried to obtain 176 mg of the threo isomer of α-methoxycarbonyl-2-phthalimidomethyl-4-ethoxycarbonyl-5-methyl-2,3-dihydro-6H-1,3-thiazine.

The mother liquors stood overnight and were than vacuum filtered. The precipitate was washed with 75% ethanol and then with petroleum ether to obtain a second crop of 103 mg of the said threo isomer for a total yield of 279 mg. The product occurred in the form of yellow crystals melting at 120°C and was soluble in chlorinated organic solvents, slightly soluble in ethanol and insoluble in water.

Analysis: $C_{19}H_{20}O_6N_2S$; molecular weight = 404.45:
Calculated: %C 56.43 %H 4.99 %N 6.93 %S 7.91;
Found: C 56.6; H 5.2; N 6.9; S 7.7
U.V. Spectrum (ethanol):
  Max. at 219–220 nm: $E_{1cm}^{1\%} = 1,050$
  Inflex. towards 239–240 nm: $E_{1cm}^{1\%} = 296$
  Max. at 290 nm: $E_{1cm}^{1\%} = 125$ STEP B': ERYTHRO ISOMER OF α-METHOXYCARBONYL-2-PHTHALIMIDOMETHYL-4-ETHOXYCARBONYL-5-METHYL-2,3-DIHYDRO-6H-1,3-THIAZINE 5.5 ml of ethyl α-keto-β-methylene-butyrate and 10.5 g of the hydrochloride of the thioaminal of methyl phthalimidomalonaldehydate (4th crop of Step C of Example I) were added to 33 ml of ethanol cooled to −15°C and was stirred under a nitrogen atmosphere at −15°C. 4.6 ml of triethylamine were added while keeping the temperature at −15°C and after letting the temperature rise to 27°C, 2 ml of N hydrochloric acid were added thereto. The mixture was allowed to stand for 30 minutes and was vacuum filtered. The precipitate was washed with ethanol cooled at −50°C and then with petroleum ether and dried to obtain 11.2 g of raw product. The mother liquors were allowed to stand overnight to get a second crop of 3.9 g of product. The two crops were dissolved in 25 ml of methylene chloride and after the addition of 120 ml of ethanol, the methylene chloride was evaporated. The mixture was vacuum filtered and the precipitate was washed with ethanol and then petroleum ether to obtain 8.95 g of the erythro isomer of α-methoxycarbonyl-2-phthalimidomethyl-4-ethoxycarbonyl-5-methyl-2,3-dihydro-1,3-thiazine melting at 160°C.

IR Spectrum (chloroform):
  Presence of carbonyls at 1779 and $1722^{cm-1}$, of N-C-COOR at $1746^{cm-1}$ and of NH at $3413^{cm-1}$.
U.V. Spectrum (ethanol):
  Max. at 219 nm: $E_{1cm}^{1\%} = 1,120$; $\epsilon=45,500$
  Inflex. towards 239–240 nm: $E_{1cm}^{1\%} = 292$
  Max. at 291 nm: $E_{1cm}^{1\%} = 141$; $\epsilon=5,700$
  Inflex. towards 299 nm: $E_{1cm}^{1\%} = 125$ Using the same procedure, 31.7 g of the hydrochloride of the thioaminal of methyl phthalimidomalonadehydate (mixture of different-crops from Example I) was reacted to obtain a mixture the threo and erythro isomers of α-methoxycarbonyl-2-phthalimidomethyl-4-ethoxycarbonyl-5-methyl-2,3-dihydro-1,3-thiazine melting at 100°C.

STEP C: HYDROCHLORIDE OF THREO ISOMER OF α-METHOXYCARBONYL-2-AMINOMETHYL-4-ETHOXYCARBONYL-5-METHYL-2,3-DIHYDRO-6H-1,3-THIAZINE

A mixture of 4.04 g of the threo isomer of Step B, 52 ml of chloroform, 10 ml of methanol and 6 ml of a solution of 10 g of hydrazine hydrate in 100 ml of chloroform was refluxed overnight with stirring under a nitrogen atmosphere and after cooling, the mixture was vacuum filtered. After washing the filter with methylene chloride, the combined organic phases were concentrated to dryness. The residue was added to 5 ml of water and after adding 10.5 ml of N hydrochloric acid, the mixture was vacuum filtered. The filter was washed with water and the aqueous phase was evaporated to dryness. The residue was added to 3 ml of ethanol to which 10 ml of ether were then added and the mixture was vacuum filtered. The residue was washed with an 80-20 mixture of ether-ethanol and then ether to obtain 1.28 gm of the hydrochloride of the threo isomer of α-methoxycarbonyl-2-aminomethyl-4-ethoxycarbonyl-5-methyl-2,3-dihydro-6H-1,3-thiazine. The mother liquors were concentrated to dryness and the residue was treated with ethanol and ether to obtain a second crop of 290 mg of the said threo isomer for a total yield of 1.57 g. The product occurred in the form of colorless crystals melting at 170°C and soluble in water and ethanol and slightly soluble in ether.

Analysis: $C_{11}H_{19}O_4N_2SCl$; molecular weight = 310.8:
Calculated %C 42.51 %H 6.16 %N 9.02 %S 10.30 %Cl 11.41; Found C 42.6; H 6.3; N 8.8; S 10.0; Cl 11.4
IR SPECTRUM(Nujol):
  Presence of carbonyl at $1752^{cm-1}$, of conjugated ester at $1681^{cm-1}$ and of C=C at $1637^{cm-1}$.
U.V. Spectrum (ethanol):
  Inflex. towards 226 nm: $E_{1cm}^{1\%} = 90$
  Max. at 277nm: $E_{1cm}^{1\%} = 109$; $\epsilon = 3400$

STEP C': OXALATE OF ERYTHRO ISOMER OF α-METHOXYCARBONYL-2-AMINOMETHYL-4-

ETHOXYCARBONYL-5-METHYL-2,3-DIHYDRO-6H-1,3-THIAZINE

A mixture of 6.07 g of erythro isomer of α-methoxycarbonyl-2-phtalimidomethyl-4-ethoxycarbonyl-5-methyl-2,3-dihydro-6H-1,3-thiazine from Step B', 79 ml of chloroform, 15 ml of methanol and 9 ml of a solution of 10 g of hydrazine hydrate in 100 ml of methanol was refluxed overnight with stirring under a nitrogen atmosphere and after cooling, the mixture was vacuum filtered. The filter was rinsed with methylene chloride and the combined filtrates were evaporated to dryness. The residue was triturated with 40 ml of ethyl acetate and vacuum filtered. The filter was washed with ethyl acetate and the filtrate was treated with activated carbon, and filtered. The filter was washed with ethyl acetate and 1.85 g of oxalic acid. $2H_2O$ was added to the filtrate after which crystallization was effected. After stirring for 15 minutes under nitrogen atmosphere, the precipitate was vacuum filtered, washed with ethyl acetate and dried to obtain 4.74 g of the oxalate of the erythro isomer of α-methoxycarbonyl-2-aminomethyl-4-ethoxycarnyl-5-methyl-2,3-dihydro-6H-1,3-thiazine melting at 140°C.

Analysis: $C_{13}H_{20}O_8N_2S$; molecular weight = 364.38; Calculated: %C 42.86; %H 5.53; %N 7.69; %S 8.78; Found C 42.0; H 5.5; N 7.9; S 8.8

IR Spectrum (Nujol):
Presence of carbonyl at $1733^{cm-1}$
U.V. Spectrum (ethanol):
Max. at 280 nm: $E_{1cm}^{1\%} = 86$ STEP D: α-CARBOXY-2-AMINOMETHYL-4-ETHOXYCARBONYL-5-METHYL-2,3-DIHYDRO-6H-1,3-THIAZINE A mixture of 20.2 g of the threo and erythro mixture of the product of Step B', 260 ml of chloroform, 50 ml of methanol and 30 ml of a solution of 10 g of hydrazine hydrate in 100 ml of methanol was refluxed overnight with stirring under a nitrogen atmosphere and after cooling, the mixture was vacuum filtered. The filter was rinsed with methylene chloride and the combined filtrates were concentrated to dryness. The residue was taken up in 150 ml of ether and after stirring 15 minutes, the mixture was vacuum filtered. The filter was rinsed with ether and the combined filtrates were treated with activated carbon, stirred for 10 minutes and vacuum filtered. The filter was washed with ether and the precipitate was dried to obtain 14 g of a mixture of threo and erythro isomers of α-methoxycarbonyl-2-aminomethyl-4-ethoxycarbonyl-5-methyl-2,3-dihydro-6H-1,3-thiazine.

A mixture of the 14 g of raw product, 25 ml of ethanol and 25 ml of water was cooled and 11.25 ml of 4N lithium hydroxide were added thereto after which the mixture was allowed to stand for 20 minutes. 4 ml of concentrated hydrochloric acid were added thereto and the mixture was left at room temperature with crystallization starting. The mixture was stirred for 30 minutes under a nitrogen atmosphere and then 150 ml of a 50-50 ether-tetrahydrofuran mixture were added. After standing for 10 minutes, the mixture was vacuum filtered and the precipitate was washed with acetone, then ether and dried to obtain 7 g of principally the threo isomer of α-carboxy-2-aminomethyl-4-ethoxycarbonyl-5-methyl-2,3-dihydro-6H-1,3-thiazine melting at 160°C with decomposition. The product occurred in the form of creamy white crystals soluble in ethanol, slightly soluble in water and acetone and insoluble in ether.

Analysis: $C_{10}H_{16}O_4N_2S.O.5H_2O$; molecular weight = 269.32 Calculated: %C 44.60 %H 6.37 %N 10.40 %S 11.90; Found: C 44.4; H 6.4; N 10.1; S 11.2

IR Spectrum (Nujol):
Bands at 3478, 3287, 1727, 1675, 1637 and $1595^{cm-1}$
U.V. Spectrum (ethanol):
Max. at 280–281 nm: $E_{1cm}^{1\%} = 126$ Using the same procedure, the hydrochloride of the threo isomer of α-methoxycarbonyl-2-aminomethyl-4-ethoxycarbonyl-5-methyl-2,3-dihydro-6H-1,3-thiazine of Step C and the oxalate of corresponding erythro isomer of Step C' were reacted in the presence of lithium hydroxide to obtain the corresponding threo and erythro isomers of α-carboxy-2-aminomethyl-4-ethoxycarbonyl-5-methyl-2,3-dihydro-6H-1,3-thiazine.

STEP E: DIETHYLAMINE SALT OF THREO ISOMER OF α-CARBOXY-2-TRITYLAMINOMETHYL-4-ETHOXYCARBONYL-5-METHYL-2,3-DIHYDRO-6H-1,3-THIAZINE

A mixture of 2.6 g of the threo isomer of α-carboxy-2-aminomethyl-4-ethoxycarbonyl-5-methyl-2,3-dihydro-6H-1,3-thiazine and 20 ml of chloroform was cooled to −3°C and then 12.5 ml of a solution of 5.6 ml of triethylamine in 20 ml of chloroform followed by a solution of 4.2 g of trityl chloride in 20 ml of chloroform were added thereto while maintaining an internal temperature of 0°C. The mixture stood for 55 minutes and the organic phase was washed with a mixture of water and N hydrochloric acid (50-12) and then with water. The aqueous phases were reextracted with methylene chloride and the combined organic phases were dried over sodium sulfate and vacuum filtered. The filter was washed with methylene chloride and the filtrate was evaporated to dryness. The residue was dissolved in 40 ml of ether and 0.8 ml of diethylamine were added with cooling. Crystallization was induced and after standing 10 minutes, the mixture was vacuum filtered. The precipitate was washed with ether and dried to obtain 2.715 g of the diethylamine salt of principally the threo isomer of α-carboxy-2-tritylaminomethyl-4-ethoxycarbonyl-5-methyl-2,3-dihydro-6H-1,3-thiazine melting at 150°C. The product occurred in the form of colorless crystals soluble in chloroform, slightly soluble in methanol and insoluble in water and ether.

Analysis: $C_{33}H_{41}O_4N_3S$; molecular weight = 575.78: Calculated: %C 68.85; %H 7.18; %N 7.30; %S 5.55; Found: C 67.6; H 7.1; N 7.1; S 5.2

IR Spectrum (chloroform):
Bands at 3292, 1722, 1696, 1634 and $1601^{cm-1}$
U.V. Spectrum (ethanol):
Inflex. towards 230 nm: $E_{1cm}^{1\%} = 205$
Max. at 288 nm: $E_{1cm}^{1\%} = 50$ STEP F: ETHYL ESTER OF CIS AND TRANS DL 7-TRITYLAMINO-DESACETOXY-CEPHALOSPORANIC ACID 20 ml of 0.5 N hydrochloric acid were added to a solution of 2.3 g of the diethylamine salt obtained in Step E in 40 ml of chloroform and the aqueous phase was decanted. The organic phase was washed with water and the combined aqueous phases were reextracted with chloroform. The organic phase was dried over sodium sulfate and evaporated to dryness. The residue was dissolved in 100 ml of ether and the solution was treated with activated carbon and filtered. The filtrate was evaporated to dryness and the residue was taken up in 200 ml of nitromethane. 0.88 g of dicyclohexylcarbodiimide were added to the cooled solution and the mixture was allowed to stand at 0°C for 4 hours after which 2 ml of pyridine were added thereto. After standing overnight at room temperature, the mixture was vacuum filtered and the filtrate was concentrated to dryness at 30°C under reduced pressure. The residue was taken up in ether and the solution was filtered and evaporated to dryness. The residue was taken up in 10 volumes of methanol and half of the methanol was evaporated. 2 ml of ether were added to the mixture and crystallization occurred over 1 hour after which the mixture was vacuum filtered. The precipitate was washed with methanol containing 15% ether and was dried to obtain 0.7 g of the ethyl ester of cis DL 7-tritylamino-desacetoxy-cephalosporanic acid melting at 184°C. The product occurred in the form of colorless crystals soluble in chloroform, slightly soluble in ethanol and ether insoluble in water.

By concentration of the mother liquors and chromotography of the residue over silica gel and elution with methylene chloride containing 5% ether and crystallization from methanol, 120 mg of the corresponding trans compound melting at 174°C were obtained.

Analysis of CIS: $C_{29}H_{28}O_3N_2S$; molecular weight = 484.53: Calculated: %C 71.88 %H 5.83 %N 5.78 %S 6.60; Found: C 71.5; H 5.7; N 5.7; S 6.8

U.V. Spectrum (ethanol):

A. CIS

Inflex. towards 227 nm: $E_{1cm}^{1\%} = 340$
Max. at 260 nm: $E_{1cm}^{1\%} = 130$; $\epsilon = 6300$

B. TRANS

Inflex. towards 226 nm: $E_{1cm}^{1\%} = 340$
Max. at 263–64 nm: $E_{1cm}^{1\%} = 132$; $\epsilon = 6400$

EXAMPLE III

BENZYL ESTER OF DL 7-TRITYLAMINO-DESACETOXY-CEPHALOSPORANIC ACID

STEP A: THREO ISOMER OF α-METHOXYCARBONYL-2-PHTHALIMIDOMETHYL-4-BENZYLOXYCARBONYL-4-HYDROXY-5-METHYL-1,3-THIAZANE 31.6 g of the hydrochloride of the thioaminal of methyl phthalimido-malonaldehydate (1st and 2nd crops of Step C of Example I) and then 14 ml of triethylamine were added at −1°C to 21.9 g of benzyl α-keto-β-methylene-butyrate (obtained by process of J. Am. Chem. Soc., 1964, p. 791) and then the mixture was vacuum filtered when the temperature returned to room temperature. The precipitate was washed with ethanol and dried to obtain 33 g of the threo isomer of α-methoxycarbonyl-2-phthalimidomethyl-4-benzyloxycarbonyl-4-hydroxy-5-methyl-1,3-thiazane which was used as is for the next step.

For analysis, the product was crystallized from a methylene chloride-methanol mixture to obtain the product in the form of yellow crystals melting at 180°C and soluble in chloroform, slightly soluble in ether and methanol and insoluble in water. Concentration of the mother liquors to dryness, dissolution in methanol and addition of N hydrochloric acid gave 1.8 g of the erythro isomer.

Analysis: $C_{24}H_{24}O_7N_2S$; molecular weight = 484.53: Calculated: %C 59.50; %H 4.99; %N 5.78; %S 6.61; Found: C 58.9; H 4.9; N 5.8; S 6.4

STEP B: THREO ISOMER OF α-METHOXYCARBONYL-2-PHTHALIMIDOMETHYL-4-BENZYLOXYCARBONYL-5-METHYL-2,3-DIHYDRO-6H-1,3-THIAZINE 12 ml of water and 2.5 ml of N hydrochloric acid were added to a solution of 24.2 g of the threo isomer of α-methoxycarbonyl-2-phtalimidomethyl-4-benzyloxycarbonyl-4-hydroxy-5-methyl-1,3-thiazane in 120 ml of dioxane and after standing for 45 minutes at room temperature, the solvent was evaporated under reduced pressure. The residue was dissolved in 50 ml of methylene chloride and the organic solution was washed with water. The aqueous phase was reextracted with methylene chloride and the combined organic phases were dried over magnesium sulfate and was vacuum filtered. The filtrate was evaporated to dryness to obtain 23.9 g of the threo isomer of α-methoxycarbonyl-2-phthalimidomethyl-4-benzyloxycarbonyl-5-methyl-2,3-dihydro-6H-1,3-thiazine which was used as is for Step C.

STEP B': ERYTHRO ISOMER OF α-METHOXYCARBONYL-2-PHTHALIMIDOMETHYL-4-BENZYLOXY CARBONYL-5-METHYL-2,3-DIHYDRO-6H-1,3-THIAZINE 3.16 g of the hydrochloride of the thioaminal of methyl phthalimido-malonaldehydate (4th crop of Step C of Example I) and then 1.4 ml of triethylamine were added to a mixture of 2.55 g of benzyl α-keto-β-methylene-butyrate and 10 ml of ethanol cooled to −10°C and after the reaction mixture returned to room temperature, the solution was evaporated to dryness. The residue was taken up in methylene chloride and 20 ml of water were added followed by decanting. The aqueous phase was reextracted with methylene chloride and the combined organic phases were dried over magnesium sulfate, vacuum filtered and concentrated to dryness. The residue was dissolved in 20 ml of methanol and 0.5 ml of N hydrochloric acid were added thereto. Crystallization was induced and after 10 minutes standing, the mixture was vacuum filtered and the crystals were washed with methanol and dried to obtain 2.61 g of the erythro isomer of α-methoxycarbonyl-2-phthalimidomethyl-4-benzyloxycarbonyl-5-methyl-2,3-dihydro-6H-1,3-thiazine. Concentration of the mother liquor to dryness gave a second yield of 770 mg of the said erythro isomer for a total yield of 3.38 g.

For analysis, the product was crystallized by dissolution in methylene chloride and precipitation with methanol to obtain the product in the form of yellow crystals melting at 138°C and soluble in chloroform, slightly soluble in methanol, ethanol and ether and insoluble in water.

Analysis: $C_{24}H_{22}O_6N_2S$; molecular weight = 466.52: Calculated: %C 61.80; %H 4.75; %N 6.01; %S 6.86; Found: C 61.5; H 4.7; N 5.9; S 6.7

STEP C: α-CARBOXY-2-AMINOMETHYL-4-BENZYLOXYCARBONYL-5-METHYL-2,3-DIHYDRO-6H-1,3-THIAZINE 50 ml of methanol and 30 ml of a 2M hydrazine hydrate methanolic solution were added to a solution of 23.9 g of a mixture of the threo and erythro isomers obtained in Step B and B' of α-methoxycarbonyl-2-phthalimidomethyl-4-benzyloxycarbonyl-5-methyl-2,3-dihydro-6H-1,3-thiazine in 250 ml of chloroform and the mixture was refluxed overnight under an nitrogen atmosphere. After cooling, the mixture was vacuum filtered and the filtrate was evaporated to dryness. The residue was stirred for 15 minutes with 130 ml of ether and then was vacuum filtered. The filtrate was treated with activated carbon, stirred for 15 minutes and then vacuum filtered. The ether solution was concentrated to dryness to obtain 15.9g of a mixture of threo and erthyro isomers of α-methoxycarbonyl-2-aminomethyl-4-benzyloxycarbonyl-5-methyl-2,3-dihydro-6H-1,3-thiazine.

The said 15.9g of product were dissolved in 25 ml of dioxane and 10 ml of water were added thereto 12.5 ml of 4N lithium hydroxide were added to the cooled mixture which was allowed to stand for 10 minutes. The pH of the mixture was adjusted to 4 by addition of concentrated hydrochloric acid and the dioxane was evaporated. Then, 80 ml of ether and 10 ml of water were added and the mixture was stirred for 2 hours and was vacuum filtered. The precipitate was empasted with ether and then with water and finally with ether and dried at 45°C under reduced pressure. The residue was taken up in 99 ml of ethanol with agitation, was vacuum filtered and dried to obtain 8.5 g of α-carboxy-2-aminomethyl-4-benzyloxycarbonyl-5-methyl-2,3-dihydro-6H-1,3-thiazine. Concentration of the mother liquors gave a second crop of 0.43 g of the said product for a total yield of 8.93 g.

For analysis, the product was dissolved in 10 volumes of ethyl acetate containing 5% of water and a slight excess of triethylamine and the pH was adjusted to 4 by addition of acetic acid. The mixture was vacuum filtered and the precipitate was washed with ethanol, then ether and dried to obtain the product in the form of cream crystals melting at 160°C with decomposition which were soluble in dilute aqueous sodium hydroxide, slightly soluble in ethanol and insoluble in water and ether.

Analysis $C_{15}H_{18}O_4N_2S \cdot O.7H_2O$; molecular weight = 335.0: Calculated: %C 53.78 %H 5.83 %N 8.36 %S 9.57; Found: C 53.7; H 5.6; N 8.5; S 9.1

IR Spectrum (Nujol):
Bands at 1701 $cm^{-1}$ (carbonyl) and at 1611 $cm^{-1}$

U.V. Spectrum (ethanol):
Max. at 283 nm: $E_{1cm}^{1\%} = 106$

STEP D: BENZYL ESTER OF DL 7-TRITYLAMINO-DESACETOXY-CEPHALOSPORANIC ACID

A solution of 5.6 ml of triethylamine in 15 ml of chloroform and then a solution of 4.2 g of trityl chloride in 20 ml of chloroform were added to a suspension of 3.224 g of α-carboxy-2-aminomethyl-4-benzyloxycarbonyl-5-methyl-2,3-dihydro-6H-1,3-thiazine in 20 ml of chloroform cooled to +3°C and the mixture was stirred for 1 hour at 6°C. The organic phase was washed with 50 ml of water containing 16 ml of N hydrochloric acid, then with 30 ml of water and concentrated to dryness. The residue was taken up in 100 ml of ether and the solution was filtered and evaporated to dryness. The residue was taken up in 60 ml of isopropyl ether and 40 ml of methanol and after the addition of 4 ml of 10% aqueous sodium bicarbonate solution and 16 ml of water, the mixture was stirred and decanted. The aqueous phase was reextracted with isopropyl ether and the methanol was removed from the combined aqueous methanol phases which were then acidified by addition of acetic acid. The mixture was vacuum filtered and the precipitate was washed with water and dried to obtain 2.06 g of α-carboxy-2-tritylaminomethyl-4-benzyloxycarbonxyl-5-methyl-2,3-dihydro-6H-1,3-thiazine.

1.68 g of the said raw thiazine were dissolved in 168 ml of nitromethane cooled to 0°C and then 0.66g of dicyclohexyl carbodiimide were added thereto. After stirring the mixture for 30 minutes, 1.5 ml of pyridine were added and the reaction mixture stood overnight at room temperature. The mixture was then filtered and the filtrate was evaporated to dryness under reduced pressure at 30°C. The residue was taken up in 30 ml of ether, filtered and concentrated to dryness. The residue was chromatographed over silica gel and eluted with methylene chloride and crystallized from methanol to obtain 151 mg of the cis form, 77 mg of the trans form and 167 mg of a mixture of the cis and trans form of the benzyl ester of DL 7-tritylamino-desacetoxy-cephalosporanic acid. The cis form of the said ester melted at 184°C and occurred as colorless crystals soluble in chloroform, slightly soluble in methanol, ethanol and ether and insoluble in water. The trans form melted at 200°C.

Analysis of cis: $C_{34}H_{30}O_3N_2S$; molecular weight = 546.69: Calculated: %C 74.71; %H 5.53; %N 5.13; %S 5.85; Found: C 74.5; H 5.5; N 5.0; S 5.4

U.V. Spectrum (ethanol):
CIS
 Inflex. towards 227 nm: $E_{1cm}^{1\%} = 296$
 Inflex. towards 259 nm: $E_{1cm}^{1\%} = 111$
 Max. at 262 nm: $E_{1cm}^{1\%} = 111$
 Inflex. towards 267 nm: $E_{1cm}^{1\%} = 106$
Trans
 Inflex. towards 228 nm: $E_{1cm}^{1\%} = 293$
 Inflex. towards 256 nm: $E_{1cm}^{1\%} = 126$

EXAMPLE IV

TERT-BUTYL ESTER OF CIS DL 7-AMINO-DESACETOXY-CEPHALOSPORANIC ACID

A current of gaseous hydrogen chloride was passed through a solution of 0.5 g of the tert-butyl ester of cis DL 7-tritylamino-desacetoxy-cephalosporanic acid in 5 ml of chloroform for 3 minutes at room temperature and the chloroform was removed under reduced pressure. The residue was taken up in ether to obtain 0.280 g of the hydrochloride of the tert.-butyl ester of cis DL-7-amino-desacetoxy-cephalosporanic acid. The said hydrochloride was dissolved in a mixture of 0.5 ml of methanol and 1.5 ml of water and the mixture was vacuum filtered and the filter was rinsed with a little methanol. The filtrate was made alkaline by the additon of 6 drops of triethylamine and was then iced and vacuum filtered. The precipitate was washed with water and dried to obtain 0.222 g of the tert.-butyl ester of cis DL 7-amino-desacetoxycephalosporanic acid melting at 160°C. The product occurred in the form of colorless crystals soluble in chloroform, slightly soluble in methanol and insoluble in water.

Analysis: $C_{12}H_{18}O_3N_2S$; molecular weight = 270.34; Calculated: %C 53.22; %H 6.71; %N 10.37; %S 11.86; Found: C 53.1; H 6.8; N 10.7; S 12.0

IR Spectrum (chloroform):
Presence of $NH_2$ at 3401 and 3333 $cm^{-1}$, of β-lactam at 1775 $cm^{-1}$, of conjugated ester at 1718 and of C=C and NH deformation at 1640 and 1625 $cm^{-1}$.

U.V. Spectrum (ethanol):
Max. at 219 nm: $E_{1cm}^{1\%} = 137$

Inflex. towards 261 nm: $E_{1cm}^{1\%} = 220$
Max. at 271 nm: $E_{1cm}^{1\%} = 234$; $\epsilon = 6300$

EXAMPLE V

Using the procedure of Example IV, the corresponding ethyl ester of cis and trans DL 7-amino-desacetoxy-cephalosporanic acid were prepared by detritylation of the ethyl ester of the respective cis and trans DL 7-tritylamino-desacetoxycephalosporanic acid.

EXAMPLE VI

Using the procedure of Example IV, the benzyl ester of cis and trans DL 7-amino-desacetoxy-cephalosporanic acid were prepared by detritylation of the benzyl ester of the respective cis and trans DL 7-tritylamino-desacetoxy-cephalosporanic acid.

EXAMPLE VII

TERT.-BUTYL ESTER OF CIS L (+) 7-AMINO-DESACETOXY-CEPHALOSPORANIC ACID 7.2 g of the tert.-butyl ester of cis DL 7-aminodesacetoxy-cephalosporanic acid were added to a solution of 4.39 g of D (—) tartaric acid in 45 ml of methanol and the mixture was refluxed. The mixture was cooled and held a few minutes at 20°C and was then vacuum filtered. The precipitate was washed with methanol, then ether and dried to obtain the tartrate of the said acid. The tartrate was suspended in 46 ml of methanol and after the addition of 3.3 ml of triethylamine, the mixture was stirred for 5 minutes and filtered to remove insolubles. The filtrate was added to water and the mixture was extracted with methylene chloride. The organic phase was dried over magnesium sulfate and the solvent was evaporated under reduced pressure. The residue was crystallized from petroleum ether to obtain 2.73 g of the tert.butyl ester of cis L (+) 7-amino-desacetoxy-cephalosporanic acid melting at 126°C and having a specific rotation of $[\alpha]_D^{20} = +100 \pm 3°$ (C=0.5% in chloroform).

The tert.-butyl ester of cis D (—) 7-amino-desacetoxycephalosporanic acid was obtained from the methanolic mother liquors and the said ester had a melting point of 126°C and a specific rotation $[\alpha]_D^{20} = -100 + 3°$ (C=0.5% in chloroform).

Various modifications of the process and products of the invention may be made without departing from the spirit or scope thereof and it is to be understood that the invention is to be limited only as defined in the appended claims.

We claim:

1. A process for the preparation of a compound of the formula

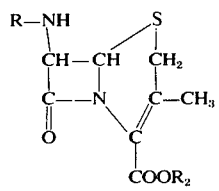

II in the form of cis, trans or cis-trans mixtures wherein R is selected from the group consisting of hydrogen and trityl and $R_2$ is lower alkyl of 1 to 6 carbon atoms optionally substituted with a chlorine and phenylalkyl of 7 to 15 carbon atoms comprising the steps of reacting an enamine of the formula

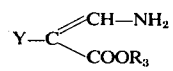

III wherein $R_3$ is selected from the group consisting of alkyl of 1 to 10 carbon atoms and phenylalkyl of 7 to 15 carbon atoms and Y is selected from the group consisting of cyclic imido, benzoylamino and thiobenzoylamino with hydrogen sulfide in the presence of an acid of the formula HX wherein X is selected from the group consisting of chlorine, bromine, —SO$_4$H and —SO$_3$H to form a thioaminal of the formula

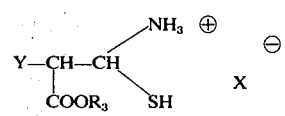

IV which occurs in erythro and/or threo isomeric form, reacting the latter in the presence of a tertiary amine with an ester of α-keto-β-methylene-butyric acid of the formula

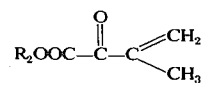

V wherein $R_2$ has the above definition to form a 1,3-thiazane of the formula

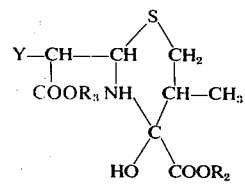

VI in the form of its erythro and/or threo form independent of the configuration of 3- and 4-carbon atoms, reacting the latter with an acid dehydrating agent to form a 1,3-thiazine of the formula

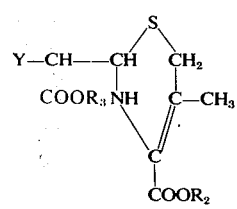

VII occurring in the form of its erythro and/or threo isomers, subjecting the latter to reaction with hydrazine for a functional exchange to form a compound of the formula

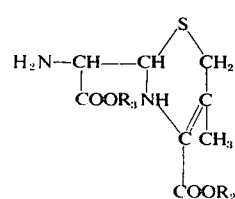

VIII occurring in the form its erythro and/or threo isomers, selectively saponifying the latter with a dilute aqueous alkali metal base to form a compound of the formula

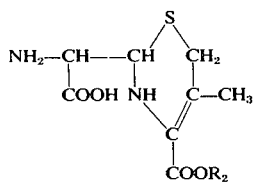   IX occurring in the form of its erythro and/or threo isomers, reacting the latter with trityl chloride to form a compound of the formula

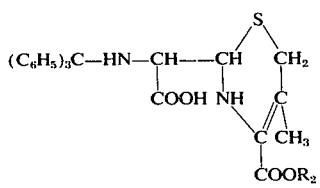   X occurring in the form of its erytro and/or threo isomers and cyclizing the latter with a dialkylcarbodiimide or dicycloalkylcarbodiimide lactamization agent to form a compound of formula II wherein R is trityl.

2. The process of claim 1 wherein the trityl derivative is subjected to acid hydrolysis to obtain the corresponding 7-amino compound.

3. A process for the preparation of DL 7-amino-desacetoxy-cephalosporanic acid compounds of the formula

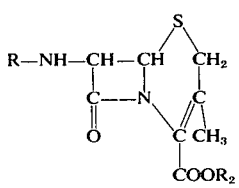

in the form of cis, trans or cis-trans mixtures, wherein R is selected from the group consisting of hydrogen and trityl and $R_2$ is selected from the group consisting of alkyl of 1 to 6 carbon atoms optionally substituted with a chlorine and phenylalkyl of 7 to 15 carbon atoms comprising the steps of reacting an enamine of the formula

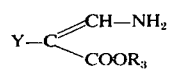

wherein Y is selected from the group consisting of cyclic imido, benzoylamino and thiobenzoylamino and $R_3$ is selected from the group consisting of alkyl of 1 to 10 carbon atoms and phenylalkyl of 7 to 15 carbon atoms with hydrogen sulfide in the presence of an acid HX wherein X is selected from the group consisting of chlorine, bromine, —$SO_4H$ and —$SO_3H$ to obtain a thioaminal of the formula

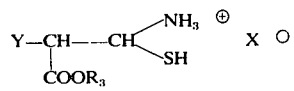

in the form of its erythro and/or threo isomers, condensing the latter in the presence of a tertiary amine with an ester of the formula

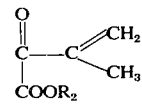

to form a 1,3-thiazane of the formula

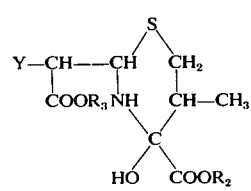

in the form its erythro and/or threo isomers independent of the 3- and 4- carbon atoms configuration, treating the said product with an acid dehydrating agent to form a compound of the formula

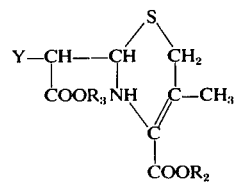

in the form of its erythro and/or threo isomers, subjecting the latter to functional exchange with hydrazine to form a compound of the formula

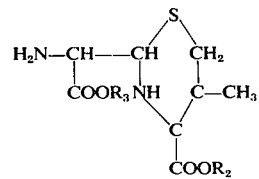

in the form of its threo and/or erythro isomers, reacting the latter with an acid of the formula $HX_1$ wherein $X_1$ is selected from the group consisting of chlorine, bromine and an acyl of an organic acid to obtain the acid addition salt of the formula

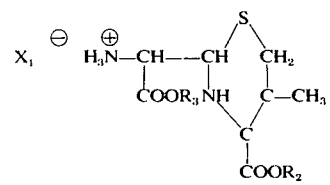

in the form of its erythro and/or threo isomers, reacting the latter with a dilute aqueous alkali metal base to obtain a compound of the formula

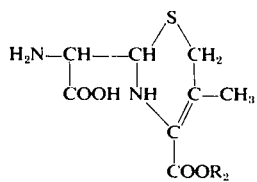

in the form of its threo and/or erythro isomers, reacting the latter with trityl chloride to obtain a compound of the formula

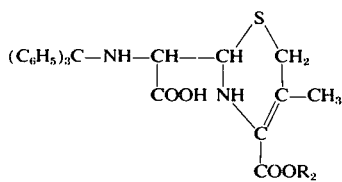

in the form of its erythro and/or threo isomers and cyclizing the latter with a dialkylcarbodiimide or dicycloalkylcarbodiimide lactamization agent to obtain the desired 7-tritylamino cephalosporanic acid compound.

4. A process for the preparation of DL 7-amino-desacetoxy-cephalosporanic acid compounds of the formula

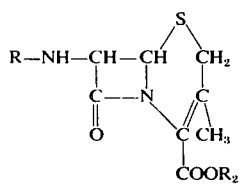

in the form of cis, trans or cis-trans mixtures, wherein R is selected from the group consisting of hydrogen and trityl and $R_2$ is selected from the group consisting of alkyl of 1 to 6 carbon atoms optionally substituted with a chlorine and phenylalkyl of 7 to 15 carbon atoms comprising the steps of reacting an enamine of the formula

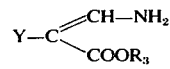

wherein Y is selected from the group consisting of cyclic imido, benzoylamino and thiobenzoylamino and $R_3$ is selected from the group consisting of alkyl of 1 to 10 carbon atoms and phenylalkyl of 7 to 15 carbon atoms with hydrogen sulfide in the presence of an acid HX wherein X is selected from the group consisting of chloride, bromine, $-SO_4H$ and $-SO_3H$ to obtain a thioaminal of the formula

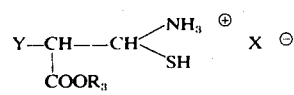

in the form of its erythro and/or threo isomers, condensing the latter in the presence of a tertiary amine with an ester of the formula

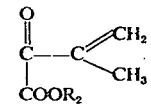

to form a 1,3-thiazane of the formula

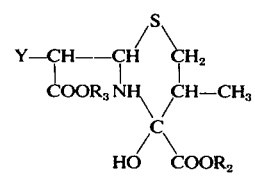

in the form its erythro and/or threo isomers independent of the 3- and 4-carbon atoms configuration, treating the said product with an acid dehydrating agent to form a compound of the formula

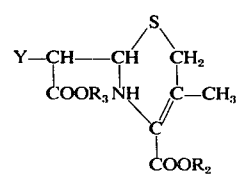

in the form of its erythro and/or threo isomers, subjecting the latter to functional exchange with hydrazine to form a compound of the formula

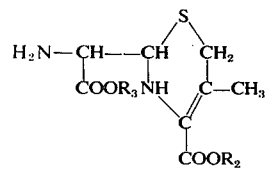

in the form of its threo and/or erythro isomers, selectively saponifying the latter with a dilute aqueous alkali metal base to form a 1,3-thiazine of the formula

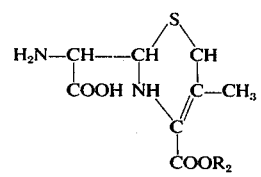

in the form of its erythro and/or threo isomers, reacting the latter with trityl chloride to form a compound of the formula

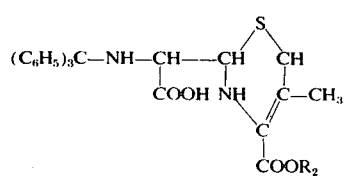

in the form of its erythro and/or threo isomers, reacting the latter with a secondary amine to form the corresponding amine salt, hydrolyzing the said salt under acid conditions followed by cyclization with a dialkyl-carbodiimide or dicycloalkylcarbodiimide lactamization agent to form the desired 7-tritylamino-cephalosporanic compound.

* * * * *

UNITED STATES PATENT OFFICE
CERTIFICATE OF CORRECTION

Patent No. 3,900,468    Dated August 19, 1975

Inventor(s) Jacques Martel and Rene Heymes    Page 1 of 9

It is certified that error appears in the above-identified patent and that said Letters Patent are hereby corrected as shown below:

Col.  Page  Line  Line
[57]               Formula

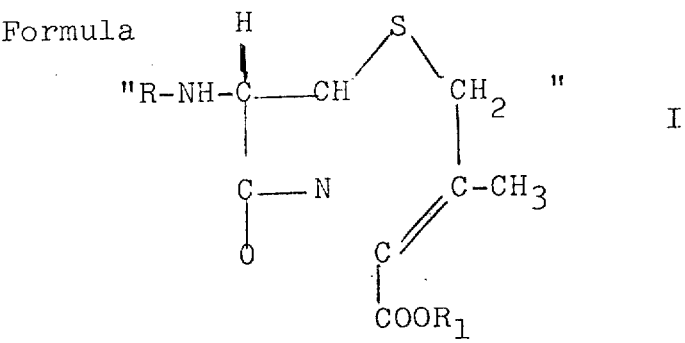

should be

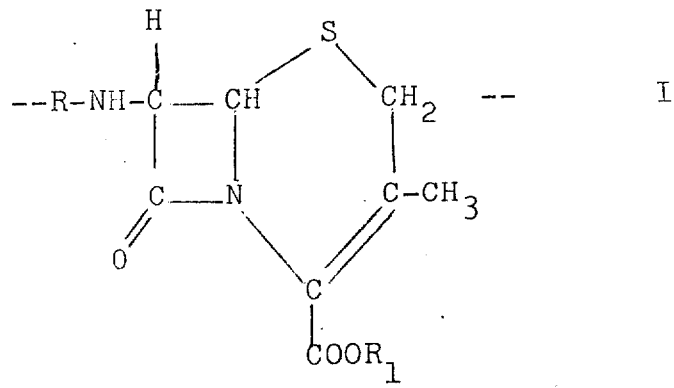

UNITED STATES PATENT OFFICE
CERTIFICATE OF CORRECTION

Patent No. 3,900,468  Dated Aug. 19, 1975

Inventor(s) JACQUES MARTEL AND RENE HEYMES

It is certified that error appears in the above-identified patent and that said Letters Patent are hereby corrected as shown below:

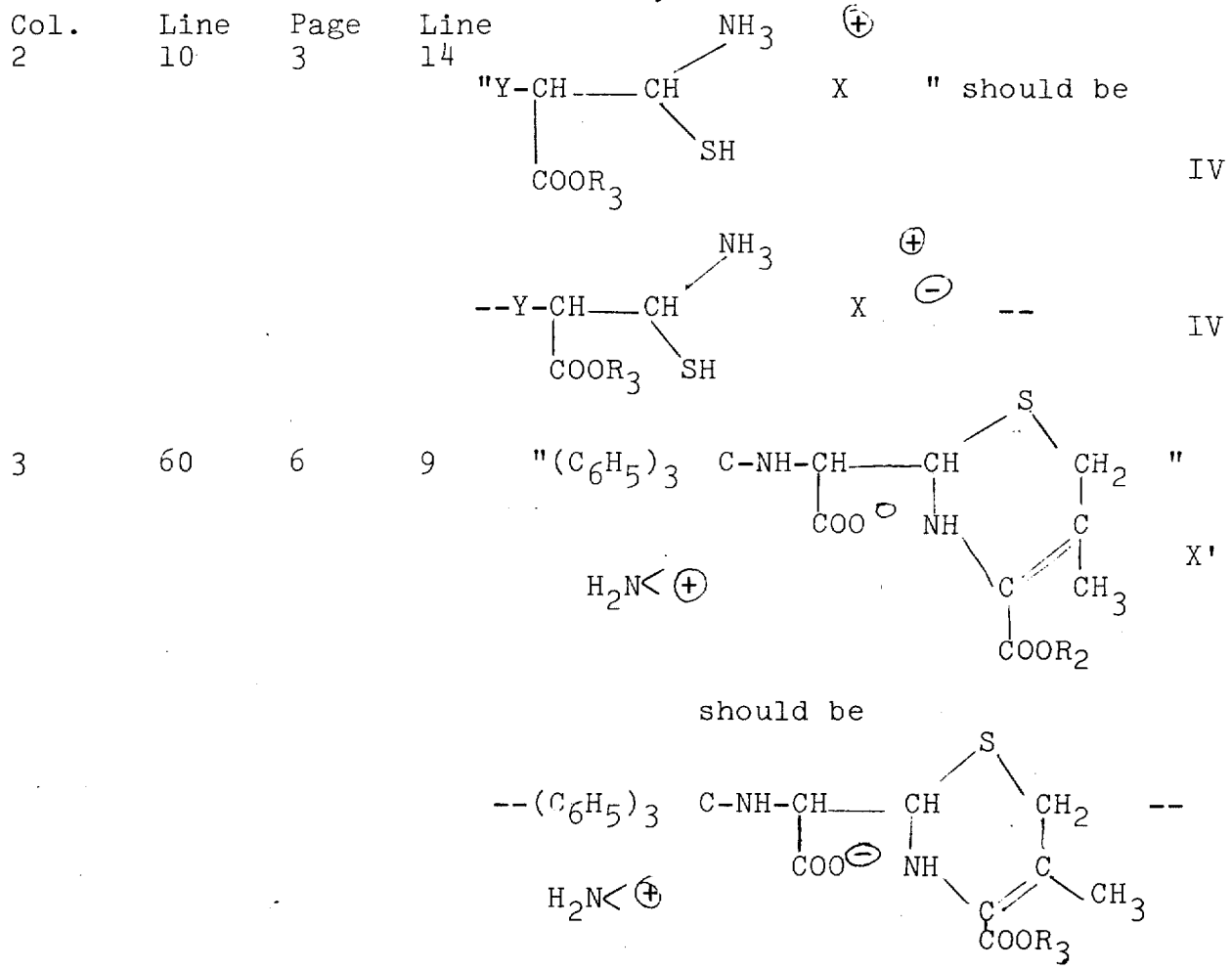

UNITED STATES PATENT OFFICE
CERTIFICATE OF CORRECTION

Patent No. 3,900,468　　　　　　　Dated Aug. 19, 1975

Inventor(s) JACQUES MARTEL AND RENE HEYMES

It is certified that error appears in the above-identified patent and that said Letters Patent are hereby corrected as shown below:

| Col. | Line | Page | Line | | | |
|---|---|---|---|---|---|---|
| 4 | 2 | 6 | 11 | "H$_2$N + " | should be | --H$_2$N ⊕ -- |
| 5 | 50 | 9 | 19 | 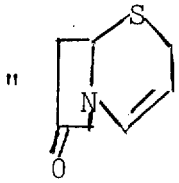 should be 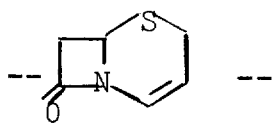 | | |
| 6 | 5 | 10 | 5 | 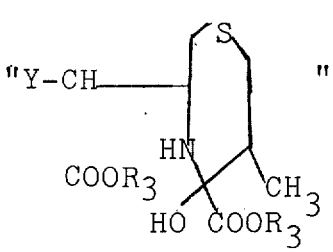 should be 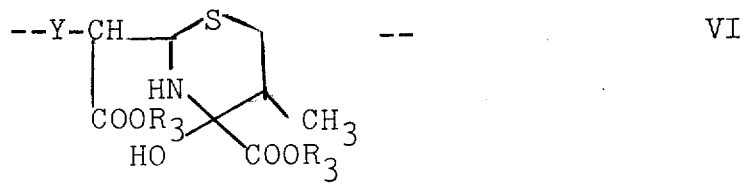 VI | | |

UNITED STATES PATENT OFFICE
CERTIFICATE OF CORRECTION

Patent No. 3,900,468      Dated    Aug. 19, 1975

Inventor(s)    JACQUES MARTEL AND RENE HEYMES

It is certified that error appears in the above-identified patent and that said Letters Patent are hereby corrected as shown below:

| Col. | Line | Page | Line | | |
|---|---|---|---|---|---|
| 6 | 25 | 10 | 15 | 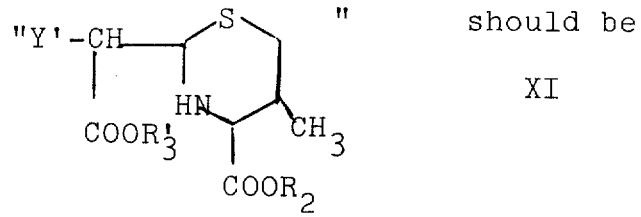 should be XI |
| | | | | 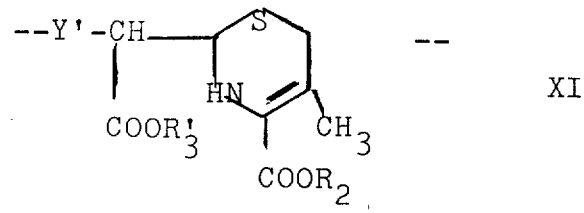 XI |
| 6 | 60 | 11 | 16 | 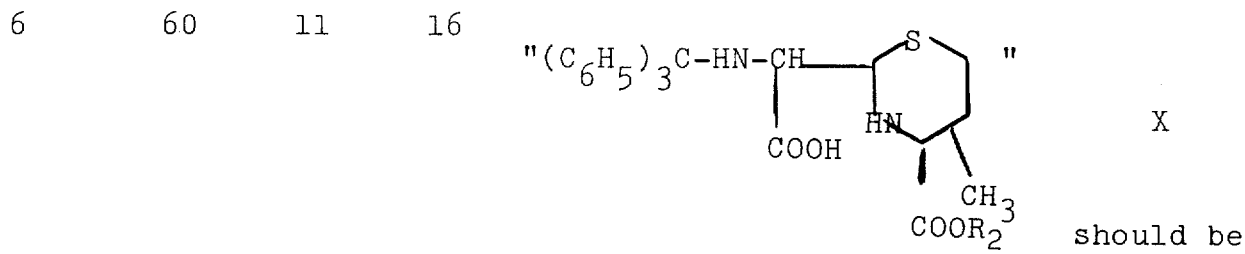 X should be |

UNITED STATES PATENT OFFICE
CERTIFICATE OF CORRECTION

Patent No. 3,900,468         Dated Aug. 19, 1975

Inventor(s) JACQUES MARTEL AND RENE HEYMES

It is certified that error appears in the above-identified patent and that said Letters Patent are hereby corrected as shown below:

| Col. | Line | Page | Line | |
|---|---|---|---|---|
| 6 | 60 | 11 | 16 (Cont'd) | 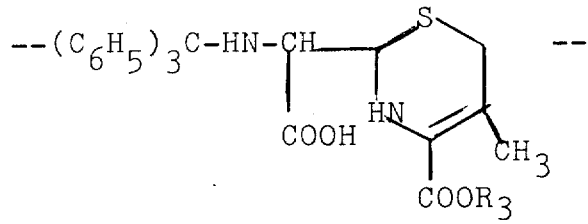 X |
| 9 | 26 | 16 | 1 | "Max at 290 290" should be --Max at 290 nm-- |
| | | | | "117;" should be --117-- |
| 9 | 23 | 15 | 25 | "964;" should be --964-- |
| 9 | 41 | 16 | 14 | "reisdue" should be --residue-- |
| 9 | 55 | 17 | 2 | "120;" should be --120-- |
| 12 | 41 | 23 | 3 | "=6,000" should be --$\varepsilon$ = 6,000-- |
| 12 | 50 | 23 | 18 | "thiazane" should be --thiazine-- |
| 13 | 14 | 24 | 12 | " " " " " " " " " " " " " " |
| 13 | 31 | 24 | 27 | " " " " " " " " " " " " " " |

UNITED STATES PATENT OFFICE
CERTIFICATE OF CORRECTION

Patent No. 3,900,468  Dated Aug. 19, 1975

Inventor(s) JACQUES MARTEL AND RENE HEYMES

It is certified that error appears in the above-identified patent and that said Letters Patent are hereby corrected as shown below:

| Col. | Line | Page | Line | |
|---|---|---|---|---|
| 14 | 18 | 26 | 20 | "1,120;" should be --1,120-- |
| 14 | 20 | 26 | 22 | "141;" should be --141-- |
| 14 | 65 | 28 | 11 | "109;" should be --109-- |
| 15 | 4 | 28 | 16 | "phtalimidomethyl" should be --phthalimidomethyl-- |
| 15 | 22 | 29 | 4 | "ethoxycarnyl" should be --ethoxycarbonyl-- |
| 17 | 34 | 33 | 20 | "130;" should be --130-- |
| 17 | 37 | 33 | 23 | "132;" should be --132-- |
| 17 | 47 | 37 | 4 | "Thiazane" should be --Thiazine-- |
| 17 | 58 | 34 | 14 | " " " " " " " " " " " " " " |
| 18 | 10 | 34 | 29 | "phtalimdomethyl" should be --phthalimidomethyl-- |
| 18 | 11 | .34 | 30 | "thiazane" should be --thiazine-- |

UNITED STATES PATENT OFFICE
CERTIFICATE OF CORRECTION

Patent No. 3,900,468                    Dated Aug. 19, 1975

Inventor(s)    JACQUES MARTEL AND RENE HEYMES

It is certified that error appears in the above-identified patent and that said Letters Patent are hereby corrected as shown below:

| Col. | Line | Page | Line | |
|---|---|---|---|---|
| 40 | 2 | 38 | 15 | "4-benzyloxycarbonxyl" should be --4-benzyloxycarbonyl-- |
| 40 | 65 | 40 | 16 | "1718" should be --$1718^{cm-1}$-- |
| 41 | 2 | 4 | 21 | "234;" should be --234-- |
| 41 | 23 | 41 | 10&11 | "aminodesacetoxy" should be --amino-desacetoxy-- |
| 41 | 46 | 41 | 30 | "-10 +3°" should be -- $-10 \pm 3°$ -- |

IN THE CLAIMS

24    Claim 3    Formula

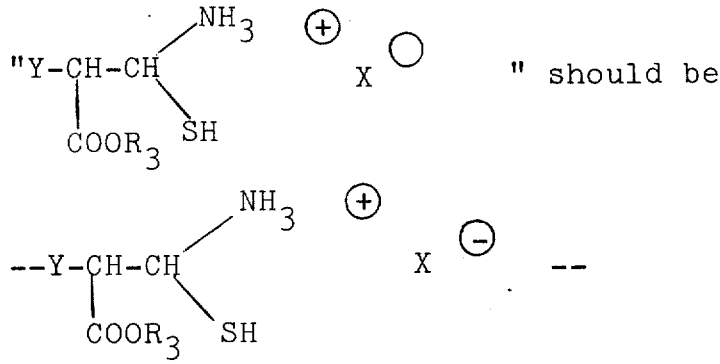

" should be $$--Y-\underset{\underset{COOR_3}{|}}{C}H-CH\genfrac{}{}{0pt}{}{NH_3}{SH} \quad \oplus \quad X \ominus \quad --$$

UNITED STATES PATENT OFFICE
CERTIFICATE OF CORRECTION

Patent No. 3,900,468    Dated Aug. 19, 1975

Inventor(s) JACQUES MARTEL AND RENE HEYMES

It is certified that error appears in the above-identified patent and that said Letters Patent are hereby corrected as shown below:

Col.   Line   Page   Line

IN THE CLAIMS (Cont'd)

24    Claim 3  Line 50 Formula   " 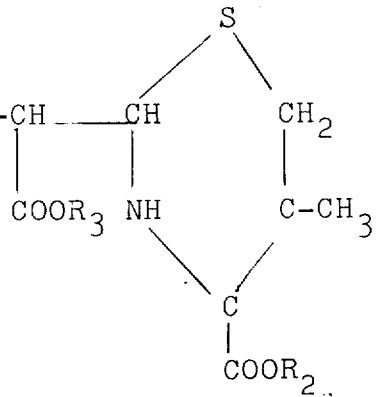  "   should b

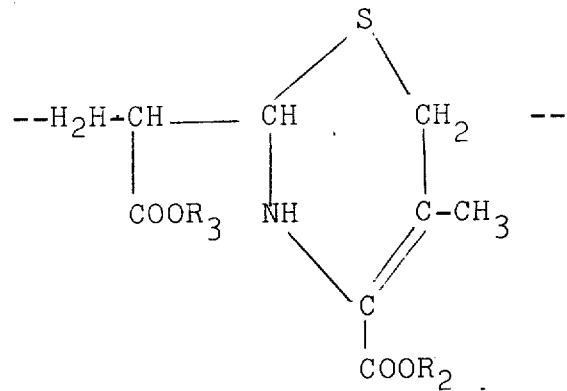

UNITED STATES PATENT OFFICE
CERTIFICATE OF CORRECTION

Patent No. 3,900,468  Dated Aug. 19, 1975

Inventor(s) JACQUES MARTEL AND RENE HEYMES

It is certified that error appears in the above-identified patent and that said Letters Patent are hereby corrected as shown below:

Col. Line  Page  Line 24   60    Claim 3 Formula 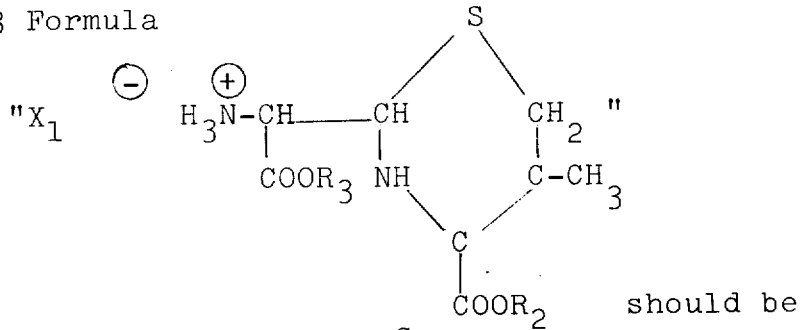 should be

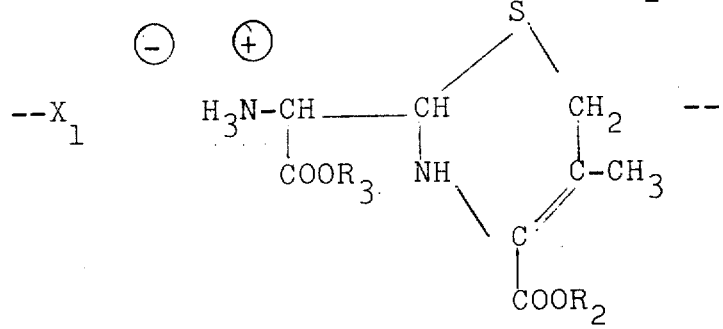

25   65    Claim 4 Formula 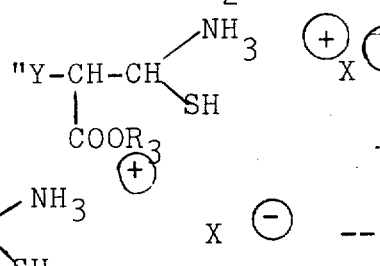 should be

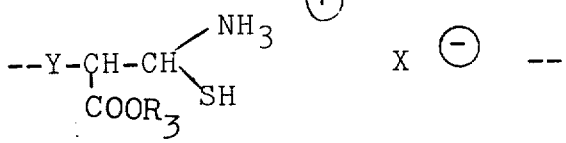

Signed and Sealed this sixth Day of April 1976

[SEAL]

Attest:

RUTH C. MASON  
*Attesting Officer*

C. MARSHALL DANN  
*Commissioner of Patents and Trademarks*